United States Patent
Kisaka et al.

(10) Patent No.: US 7,864,484 B2
(45) Date of Patent: Jan. 4, 2011

(54) HARD-DISK DRIVE

(75) Inventors: Masashi Kisaka, Kanagawa (JP); Hiroshi Uchida, Kanagawa (JP)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 32 days.

(21) Appl. No.: 12/474,913

(22) Filed: May 29, 2009

(65) Prior Publication Data

US 2009/0296265 A1 Dec. 3, 2009

(30) Foreign Application Priority Data

May 30, 2008 (JP) ............................... 2008-143529

(51) Int. Cl.
*G11B 21/02* (2006.01)
*G11B 5/596* (2006.01)

(52) U.S. Cl. .................... 360/75; 360/77.02; 360/78.04

(58) Field of Classification Search ........................ None
See application file for complete search history.

(56) References Cited

U.S. PATENT DOCUMENTS

| | | | |
|---|---|---|---|
| 6,219,196 B1 * | 4/2001 | Semba et al. | 360/75 |
| 6,741,914 B1 * | 5/2004 | Tze Ming Pang | 700/276 |
| 6,853,512 B2 | 2/2005 | Ozawa | |
| 2003/0076615 A1 * | 4/2003 | Ding et al. | 360/77.02 |
| 2004/0105294 A1 * | 6/2004 | Kisaka | 365/145 |
| 2008/0007861 A1 * | 1/2008 | Park et al. | 360/75 |

FOREIGN PATENT DOCUMENTS

JP 04038777 2/1992

OTHER PUBLICATIONS

Kisaka, Masashi "Adaptive Notch Filter by Using a Frequency Chasing Filter", *IIC-06-136(Hitachi Global Storage Technologies)*, 27-30.
Kisaka, Masashi "Frequency Chasing Peak Filter", *IIC-04-70 (Hitachi Global Storage Technologies)*, 1-5.

* cited by examiner

*Primary Examiner*—Andrew L Sniezek

(57) ABSTRACT

A hard-disk drive (HDD). The HDD includes a main control circuit. The main control circuit includes a frequency-hunting peak filter. The frequency-hunting peak filter includes a peak filter wherein a gain at a center frequency becomes finite and a reciprocal of the transfer function is represented by $z/F_D$ in z-transform space. The denominator of the transfer function of the peak filter that is represented by $F_D$, has a real part that becomes zero at the center frequency and an imaginary part that becomes a positive number at the center frequency. In addition, the frequency-hunting peak filter includes a frequency updating unit that updates the center frequency to converge onto a frequency of disturbance by obtaining a comparative relation between the center frequency and the frequency of disturbance acting on the control system in accordance with a phase difference between an input and output of the transfer function represented by $z/F_D$.

10 Claims, 5 Drawing Sheets

HARD-DISK DRIVE

CROSS-REFERENCE TO RELATED APPLICATION

This application claims priority from the Japanese Patent Application No. 2008-143529, filed May 30, 2008, the disclosure of which is incorporated herein in its entirety by reference.

TECHNICAL FIELD

Embodiments of the present invention relate to hard-disk drives (HDD's).

BACKGROUND

In a hard-disk drive (HDD), servo data is recorded along tracks formed on a magnetic-recording disk, in which the servo data is readable by a magnetic-recording head flying over the magnetic-recording disk. Consequently, the HDD has an actuator control system that controls an actuator, which causes a relative movement of the magnetic-recording head with respect to the magnetic-recording disk, in correspondence to the read out servo data.

The actuator control system, such as described above, is provided with various countermeasures against periodic disturbances occurring because of various factors. However, such disturbances include those such as vibrations externally imposed on the HDD, those having a frequency that cannot easily be pre-identified, and those having a frequency that fluctuates over time, such that it is difficult to sufficiently suppress such disturbances.

SUMMARY

Embodiments of the present invention include a hard-disk drive (HDD). The HDD includes a main control circuit for an actuator configured to move a magnetic-recording head relative to a magnetic-recording disk. The main control circuit includes a frequency-hunting peak filter. The frequency-hunting peak filter includes a peak filter wherein a gain at a center frequency becomes finite and a reciprocal of the transfer function is represented by $z/F_D$ in z-transform space. The denominator of the transfer function of the peak filter that is represented by $F_D$, has a real part and an imaginary part, wherein the real part of the denominator of the transfer function becomes zero at the center frequency and the imaginary part of the denominator of the transfer function becomes a positive number at the center frequency. The frequency-hunting peak filter also includes a frequency updating unit that updates the center frequency to converge onto a frequency of a disturbance by obtaining a comparative relation between the center frequency and the frequency of the disturbance acting on the control system in accordance with a phase difference between an input and output of the transfer function represented by $z/F_D$.

DESCRIPTION OF THE DRAWINGS

The accompanying drawings, which are incorporated in and form a part of this specification, illustrate embodiments of the invention and, together with the description, serve to explain the embodiments of the invention.

Figure 1:
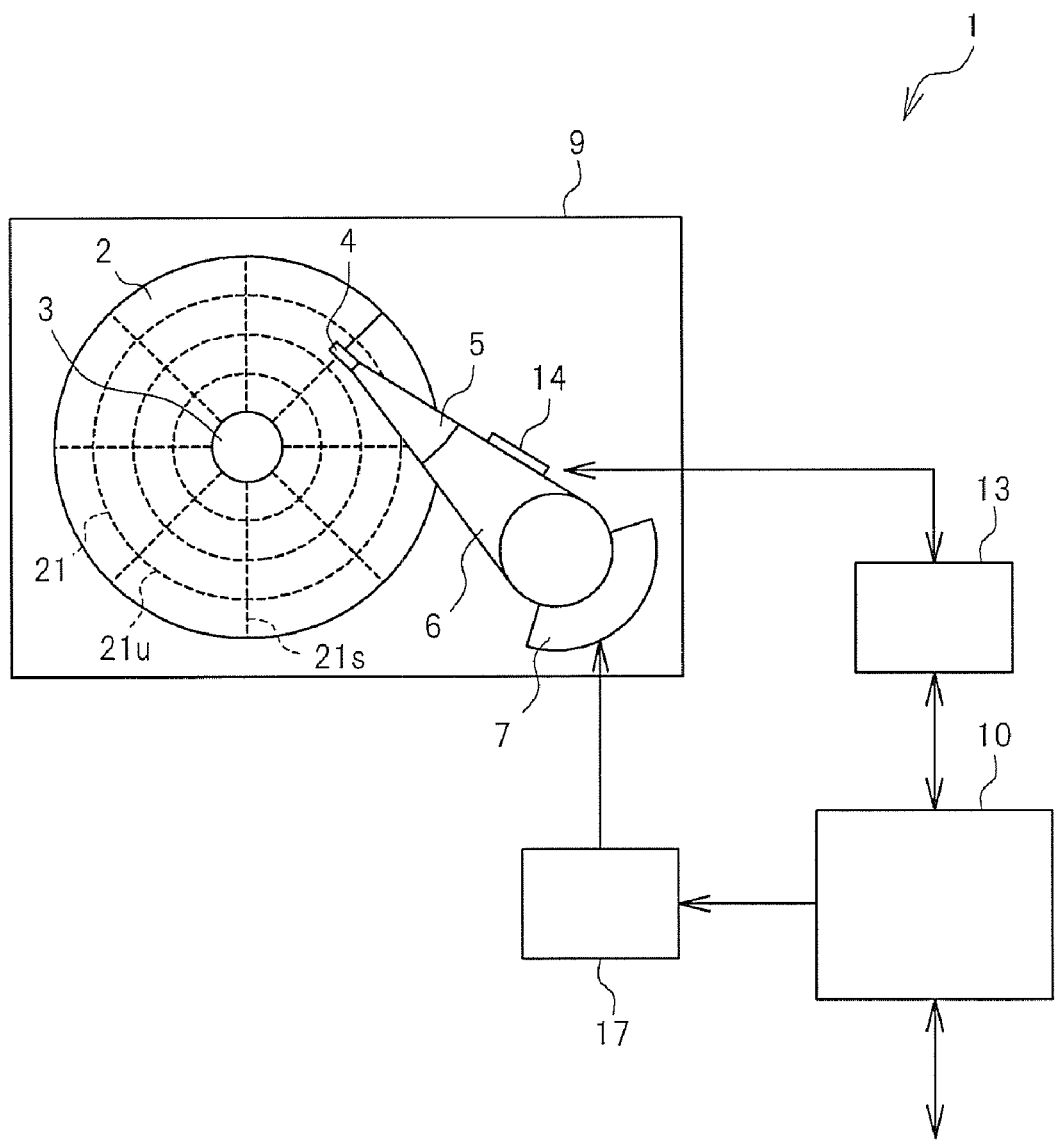
FIG. 1 is a block diagram showing an example configuration of one embodiment of a hard-disk drive (HDD), in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention.

Description of Embodiments of the Present Invention for a Hard-Disk Drive

For hard disk drives (HDD's) including a conventional frequency-hunting peak filter, the gain at the center frequency of the peak filter is set to infinity, so that phase variation is increased around the center frequency to the point that the phase variation reduces the ability of the frequency-hunting peak filter to suppress disturbances. Similarly, for HDD's including a frequency-hunting notch filter, the gain at the center frequency of the notch filter is set to zero, so that phase variation is increased around the center frequency to the point that the phase variation reduces the ability of the frequency-hunting notch filter to suppress disturbances. Embodiments of the present invention address these issues by providing a hard-disk drive (HDD) including a main control unit that includes either a frequency-hunting peak filter or frequency-hunting notch filter capable of suppressing the phase variation around the center frequency. Thus, in accordance with one embodiment of the present invention, the gain at the center frequency of the frequency-hunting peak filter may be set to a finite value so that phase variations around the center frequency may be suppressed. Moreover, in accordance with another embodiment of the present invention, the gain at the center frequency of the frequency-hunting notch filter may be set to a non-zero value so that phase variations around the center frequency may also be suppressed.

In accordance with an embodiment of the present invention, the HDD includes a main control circuit for an actuator configured to move a magnetic-recording head relative to a magnetic-recording disk; the main control circuit includes a frequency-hunting peak filter; the frequency-hunting peak filter includes a peak filter wherein a gain at a center frequency becomes finite and a reciprocal of the transfer function is represented by z/$F_D$ in z-transform space, where a denominator of the transfer function of the peak filter that is represented by $F_D$, has a real part and an imaginary part, wherein the real part of the denominator of the transfer function becomes zero at the center frequency and the imaginary part of the denominator of the transfer function becomes a positive number at the center frequency; and the frequency-hunting peak filter also includes a frequency updating unit that updates the center frequency to converge onto a frequency of a disturbance by obtaining a comparative relation between the center frequency and the frequency of the disturbance acting on the control system in accordance with a phase difference between an input and output of the transfer function represented by z/$F_D$.

In one embodiment of the present invention, the transfer function represented by z/$F_D$ is represented by a first equation given by:

$$\frac{z}{F_D} = \frac{z}{(1+l)z^2 - 2kz + 1 - l}$$

where k represents a variable corresponding to the center frequency, and l represents a value satisfying: $0<l<1$.

Furthermore, in one embodiment of the present invention, the transfer function represented by z/$F_D$ is represented by a second equation given by:

$$\frac{z}{F_D} = \frac{z}{(1+l)z^2 - 2\cos 2\pi f_0 z + 1 - l}$$

where $f_0$ represents the center frequency, and l represents a value satisfying: $0<l<1$.

Furthermore, in one embodiment of the present invention, the transfer function represented by z/$F_D$ is represented by a third equation given by:

$$\frac{z}{F_D} = \frac{1}{2\cos\omega - 2k + 2il\sin\omega}$$

where k represents a variable corresponding to the center frequency, and l represents a value satisfying: $0<l<1$.

In accordance with an embodiment of the present invention, a method for controlling a hard-disk drive that includes a main control circuit for an actuator that is configured to move a magnetic-recording head relative to a magnetic-recording disk, wherein the main control circuit includes a frequency-hunting peak filter, includes applying the frequency-hunting peak filter wherein the frequency-hunting peak filter includes a peak filter wherein a gain at a center frequency becomes finite and a reciprocal of the transfer function is represented by z/$F_D$, where a denominator of the transfer function of the peak filter that is represented by $F_D$ has a real part and an imaginary part, wherein the real part of the denominator of the transfer function becomes zero at the center frequency and the imaginary part of the denominator of the transfer function becomes a positive number at the center frequency; and the method also includes applying a frequency updating unit that updates the center frequency to converge onto a frequency of a disturbance by obtaining a comparative relation between the center frequency and the frequency of the disturbance acting on the control system in accordance with a phase difference between an input and output of the transfer function represented by z/$F_D$.

Furthermore, in accordance with an embodiment of the present invention, a HDD includes a main control circuit for an actuator configured to move a magnetic-recording head relative to a magnetic-recording disk; the main control circuit includes a frequency-hunting notch filter; the frequency-hunting notch filter includes a notch filter wherein a gain at a center frequency does not become zero and the transfer function is represented by $F_D$/z, where a numerator of the transfer function of the notch filter that is represented by $F_D$, has a real part and an imaginary part, wherein the real part of the numerator of the transfer function becomes zero at the center frequency and the imaginary part of the numerator of the transfer function becomes a positive number at the center frequency; and the frequency-hunting notch filter also includes a frequency updating unit that updates the center frequency to converge onto a frequency of a disturbance by obtaining a comparative relation between the center frequency and the frequency of the disturbance acting on the control system in accordance with a phase difference between an input and output of the transfer function represented by $F_D$/z.

In one embodiment of the present invention, the transfer function represented by $F_D$/z is represented by a fourth equation given by:

$$\frac{F_D}{z} = \frac{(1+l)z^2 - 2kz + 1 - l}{z}$$

where k represents a variable corresponding to the center frequency, and l represents a value satisfying: $0<l<1$.

Furthermore, in one embodiment of the present invention, the transfer function represented by $F_D$/z is represented by a fifth equation given by:

$$\frac{F_D}{z} = \frac{(1+l)z^2 - 2\cos 2\pi f_0 z + 1 - l}{z}$$

where $f_0$ represents the center frequency, and l represents a value satisfying: $0<l<1$.

Furthermore, in one embodiment of the present invention, the transfer function represented by $F_D$/z is represented by a sixth equation given by:

$$\frac{F_D}{z} = 2\cos\omega - 2k + 2il\sin\omega$$

where k represents a variable corresponding to the center frequency, and l represents a value satisfying: $0<l<1$.

Furthermore, in accordance with an embodiment of the present invention, a method for controlling a hard-disk drive that includes a main control circuit for an actuator that is configured to move a magnetic-recording head relative to a magnetic-recording disk, wherein the main control circuit includes a frequency-hunting notch filter, includes applying the frequency-hunting notch filter wherein a gain at a center frequency does not become zero and the transfer function is represented by $F_D/z$, where a numerator of the transfer function of the notch filter that is represented by $F_D$, has a real part and an imaginary part, wherein the real part of the numerator of the transfer function becomes zero at the center frequency and the imaginary part of the numerator of the transfer function becomes a positive number at the center frequency; and the method also includes applying a frequency updating unit that updates the center frequency to converge onto a frequency of a disturbance by obtaining a comparative relation between the center frequency and the frequency of the disturbance acting on the control system in accordance with a phase difference between an input and output of the transfer function represented by $F_D/z$.

With reference now to FIG. 1, in accordance with an embodiment of the present invention, an example configuration of a HDD 1 is shown. Embodiments of the present invention having identical configurations will be designated by the same numerals in the drawings, and detailed descriptions thereof will be omitted if described elsewhere. The HDD 1 includes a magnetic-recording disk 2 and head-gimbal assembly (HGA) 6 housed in a disk enclosure 9 (DE). The magnetic-recording disk 2 is mounted to a spindle motor 3 provided in a bottom portion of the DE 9. A plurality of tracks 21 that are concentrically arranged are formed on the magnetic-recording disk 2. A servo-data field 21s is provided on each of the tracks 21 along the circumferential direction within each sector; and, a user data field 21u is provided between each servo-data field 21s. Servo data, including address data and a burst signal, is recorded in the servo-data field 21s. User data is recorded in the user data field 21u. The HGA 6 is pivotally supported to rotatably access a portion of the magnetic-recording disk 2. The magnetic-recording head 4 is supported at a distal end of the HGA 6. A voice-coil motor (VCM) 7 is provided at a proximal end of the HGA 6. The VCM 7 rotatably drives the HGA 6, thereby allowing the magnetic-recording head 4 to move along a substantially radial direction over the magnetic-recording disk 2.

With further reference to FIG. 1, in accordance with an embodiment of the present invention, the HDD 1 further includes a main control circuit 10, a read/write channel 13 (R/W channel), and a motor driver 17 on an integrated circuit (IC) chip outside the DE 9. The main control circuit 10 includes a microprocessor unit (MPU) and memories such as a read-only memory (ROM) and random-access memory (RAM). The main control circuit 10 reads out and executes a program stored in the memory, which implements various types of control functions, such as position control of the magnetic-recording head 4 and recording/read-back control of data. The main control circuit 10 further includes a hard-disk controller (HDC) and a buffer memory. The HDC includes, without limitation thereto, an interface controller, an error correction circuit, and a buffer controller. For position control of the magnetic-recording head 4, the main control circuit 10 specifies or identifies a present position of the magnetic-recording head 4 in accordance with servo data input from the R/W channel 13, and generates a control signal for positioning the magnetic-recording head 4 on a target track, and outputs it to the motor driver 17. The motor driver 17 performs an analog conversion of the signal, and amplifies and outputs the signal to the VCM 7. For recording/read-back control of data, upon receipt of user data to be recorded onto the magnetic-recording disk 2 from an external host, the main control circuit 10 outputs the user data to the R/W channel 13. Further, upon receipt of demodulated user data from the R/W channel 13, the main control circuit 10 transmits the user data to the external host.

With further reference to FIG. 1, in accordance with an embodiment of the present invention, upon receipt of user data input from the main control circuit 10, the R/W channel 13 modulates the user data and outputs the data to the head amplifier 14. Further, upon receipt of an amplified read-back signal input from the head amplifier 14, the R/W channel 13 converts the read-back signal to a digital signal, and demodulates and outputs the signal to the main control circuit 10. Further, the R/W channel 13 extracts servo data at a predetermined sampling interval and outputs it to the main control circuit 10. Upon receipt of modulated user data input from the R/W channel 13, the head amplifier 14 converts the user data to a recording signal and outputs it to the magnetic-recording head 4. Further, when a read-back signal read back from the magnetic-recording disk 2 is input from the magnetic-recording head 4, the head amplifier 14 amplifies the read-back signal and outputs it to the R/W channel 13. Upon receipt of a recording signal input from the head amplifier 14, the magnetic-recording head 4 applies a write field to the magnetic-recording disk 2, corresponding to the recording signal. Thus, the magnetization pattern representing user data is recorded onto the magnetic-recording disk 2. Further, the magnetic-recording head 4 reads back the magnetization pattern recorded on the magnetic-recording disk 2 from the fringing flux emanating from magnetic-recording disk 2 as a read-back signal, and outputs the read-back signal to the head amplifier 14.

Figure 2:
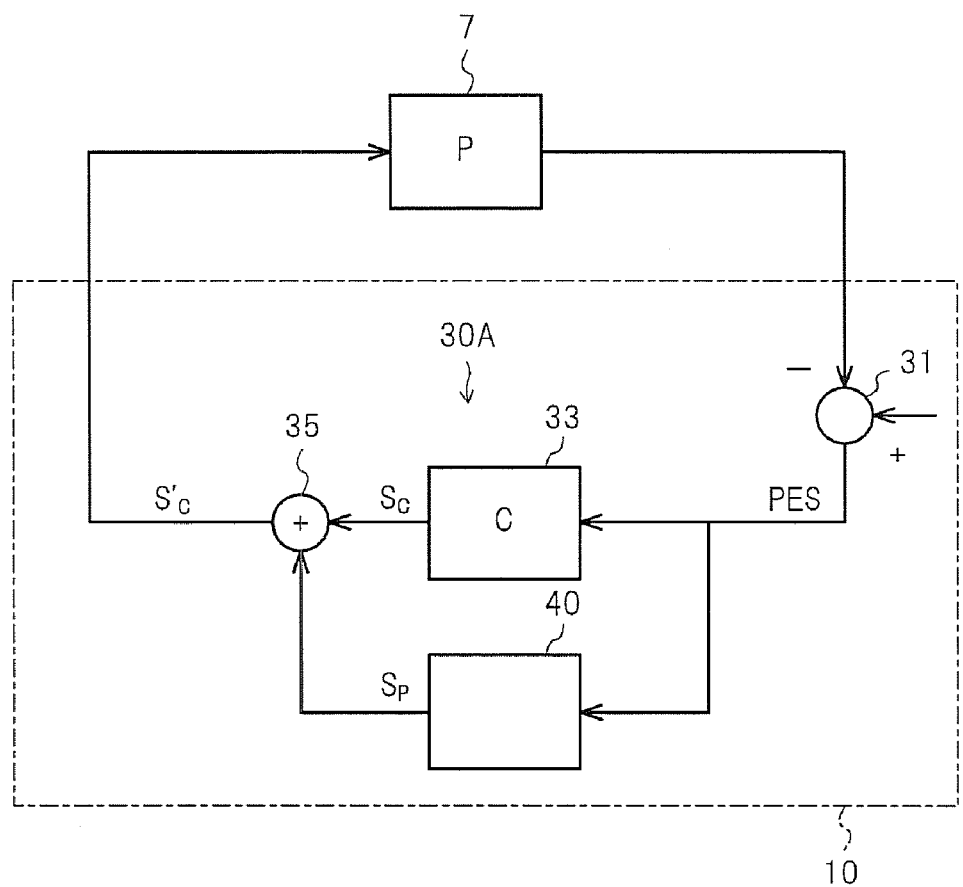
FIG. 2 is a block diagram showing an example configuration of a main control circuit including a frequency-hunting peak filter, in accordance with an embodiment of the present invention.

Description of Embodiments of the Present Invention for the Hard-Disk Drive Having a Main Control Circuit Including a Frequency-Hunting Peak Filter With reference now to FIG. 2, in accordance with an embodiment of the present invention, an example configuration of a main control circuit 10 including a frequency-hunting peak filter 40 is shown. FIG. 2 illustrates the functional configuration of the main control circuit 10. The main control circuit 10 includes a position error signal (PES) generation circuit 31, a controller 33, an adder unit 35, and a frequency-hunting peak filter 40, which form a control system 30A for the VCM 7 that controls the access of the magnetic-recording disk 2 by the magnetic-recording head 4 in accordance with software operation of the MPU. The PES generation circuit 31 obtains a differential signal based on the difference between a given position of a target track and an actual position of the magnetic-recording head 4, thereby generating a PES representing the position error of the magnetic-recording head 4. The given position of a target track is determined in accordance with a recording or read-back instruction issued from the external host, and the actual position of the magnetic-recording head 4 is identified in accordance with servo data input from the R/W channel 13. The PES is generated from the burst signal contained in the servo data. Based on the PES generated by the PES generation circuit 31, the controller 33 generates a control signal $S_C$ that drives the VCM 7, and outputs the control signal $S_C$ to adder unit 35. The control signal $S_C$ acts to suppress the position error of the magnetic-recording head 4, thereby settling the control system 30A into a stable state.

With further reference to FIG. 2, in accordance with an embodiment of the present invention, the frequency-hunting peak filter 40 filters the PES, which is input from the PES generation circuit 31, and outputs a signal $S_P$ to the adder unit 35. The adder unit 35 sums the control signal $S_C$, which has been output from the controller 33, with the signal $S_P$, which has been output from the frequency-hunting peak filter 40, and outputs a control signal $S'_C$ to VCM 7 via the motor driver 17. The control signal $S_C$, which is output from the controller 33, enables the magnetic-recording head 4 to follow the target track. The signal $S_P$, which is output from the frequency-hunting peak filter 40, acts to cancel the influence of a disturbance acting on the control system 30A. This causes the control signal $S'_C$, which is output from the adder unit 35, to suppress components of the disturbance contained in the PES. The configuration of the frequency-hunting peak filter 40 is next described.

Figure 3:
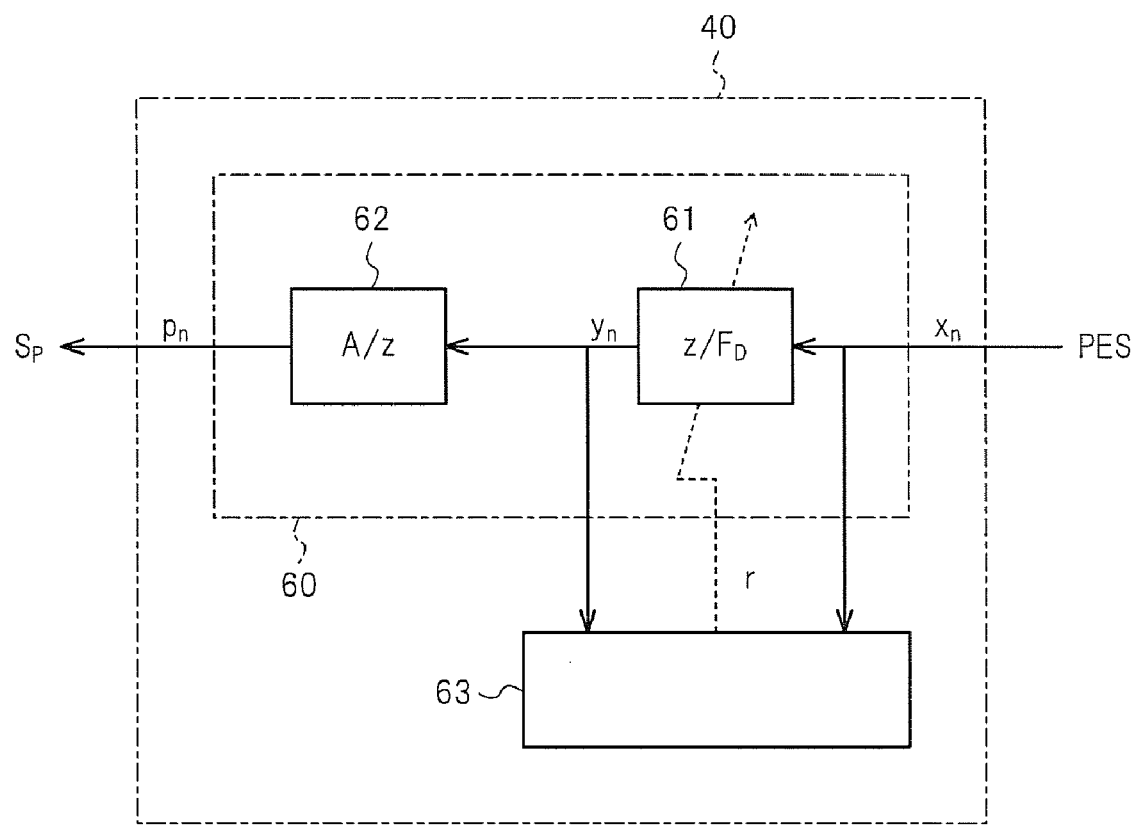
FIG. 3 is a block diagram showing an example configuration of a frequency-hunting peak filter, in accordance with an embodiment of the present invention.

With reference now to FIG. 3, in accordance with an embodiment of the present invention, an example configuration of a frequency-hunting peak filter 40 is shown. The frequency-hunting peak filter 40 includes a peak filter 60, which is a resonant filter, and a frequency updating unit 63. The peak filter 60 generates from an input signal $x_n$, an output signal $p_n$ formed by amplifying a frequency component of the center frequency, which is the peak frequency, and outputs the output signal $p_n$. In this case, the input signal $x_n$ corresponds to the PES, which is input from the PES generation circuit 31, and the PES corresponds to the signal $S_P$, which is output to the adder unit 35. A transfer function P(z) of the peak filter 60 is represented by Eq. 1 below. In Eq. 1, A is the numerator of the transfer function of the peak filter 60, and $F_D$ is the denominator of the transfer function of the peak filter 60. In addition, k is a variable corresponding to the center frequency of the peak filter 60, and l is a value satisfying: $0<l<1$.

$$P(z) = \frac{A}{F_D} = \frac{A}{(1+l)z^2 - 2kz + 1 - l}$$ Eq. 1

Further, k is represented by Eq. 2 below. In Eq. 2, $f_0$ represents a center frequency, which is the peak frequency, of the peak filter 60, and $\omega_0$ represents an angular frequency corresponding to the center frequency of the peak filter 60.

$$k = \cos 2\pi f_0 = \cos \omega_0$$ Eq. 2

With further reference to FIG. 3, in accordance with an embodiment of the present invention, the transfer function P(z) of the peak filter 60 may be separated into a filter 61 with a transfer function represented by $z/F_D$ and a filter 62 with a transfer function represented by A/z. The transfer function represented by $z/F_D$, which is the transfer function of the filter 61, may be represented by Eq. 3 below, and may be further represented by Eq. 4 below.

$$\frac{z}{F_D} = \frac{z}{(1+l)z^2 - 2kz + 1 - l}$$ Eq. 3

$$\begin{aligned}\frac{z}{F_D} &= \frac{z}{z^2 - 2kz + 1 + l(z^2 - 1)} \\ &= \frac{1}{z + \frac{1}{z} - 2k + l\left(z - \frac{1}{z}\right)} \\ &= \frac{1}{2\cos\omega - 2k + 2il\sin\omega}\end{aligned}$$ Eq. 4

With further reference to FIG. 3, in accordance with an embodiment of the present invention, the denominator of the transfer function represented by $z/F_D$ is represented by the sum of a real part that reaches zero at the center frequency $f_0$ and an imaginary part that does not reach zero at the center frequency $f_0$. The real part reaching zero at the center frequency $f_0$ has the same form as the denominator of a transfer function exhibiting a gain that becomes infinite at the center frequency thereof. However, the imaginary part does not reach zero at the center frequency $f_0$, so that even when the real part reaches zero, the denominator of the transfer function, which is represented by $z/F_D$ does not become zero. More specifically, in the peak filter 60, since the imaginary part is present, the gain at the center frequency $f_0$ does not become infinite, but it becomes finite. In particular, the imaginary part becomes a positive value at the center frequency $f_0$. Furthermore, the imaginary part at all times has a positive value within the range of $0<\omega<\pi$. As used herein, the meaning of the phrase "the imaginary part has a positive value" means that the portion of the imaginary part excluding the imaginary unit i has a positive value.

With further reference to FIG. 3, in accordance with an embodiment of the present invention, the input signal $x_n$ of the filter 61 and an output signal $y_n$ of the filter 61 are input into the frequency updating unit 63. The frequency updating unit 63 obtains the comparative relation between the center frequency $f_0$ of the peak filter 60 and the frequency of disturbance acting on the control system 30A in accordance with the phase difference between the input signal $x_n$ and the output signal $y_n$. As a result, the frequency updating unit 63 outputs an update signal r acting to update the center frequency $f_0$ of the peak filter 60 to the filter 61 represented by $z/F_D$. This causes the center frequency $f_0$ of the peak filter 60 to be updated and to asymptotically approach the frequency of the disturbance acting on the control system 30A. The peak filter 60 is next described.

With further reference to FIG. 3, in accordance with an embodiment of the present invention, consider first the case where a transfer function with the denominator $F_D$ of the peak filter 60 is represented by Eq. 5 below. In Eq. 5, $b_2$, $b_1$, and $b_0$ represent coefficients of the respective terms.

$$F_D = b_2 z^2 - 2b_1 z + b_0$$ Eq. 5

Furthermore, a disturbance r at a time nT is represented by Eq. 6 below. In Eq. 6, $r_n$ represents the value of the disturbance r at the time nT, and $\omega_r$ represents an angular frequency.

$$r_n = A \sin n\omega_r T$$ Eq. 6

In addition, when using the discrete Z transform, the relation between the input and output of the filter 61 having the transfer function represented by $z/F_D$ is represented as Eq. 7 below. Eq. 7 may be modified as Eq. 8, and it is represented as Eq. 9 below in terms of time.

$$y(z) = \frac{z}{b_2 z^2 - 2b_1 z + b_0} x(z)$$ Eq. 7

$$(b_2 z - 2b_1 + b_0 z^{-1}) y(z) = x(z)$$ Eq. 8

$$b_2 y_{n+1} - 2b_1 y_n + b_0 y_{n-1} = x_n$$ Eq. 9

With further reference to FIG. 3, in accordance with an embodiment of the present invention, an average of products $x_n y_n$ of the inputs and outputs of the filter 61 to be calculated in the frequency updating unit 63 is represented by Eq. 10 below. In Eq. 10, E represents a time average of the variables in parentheses.

$$E(x_n y_n) = b_2 E(y_{n+1} y_n) + b_0 E(y_{n-1} y_n) - 2b_1 E(y_n^2)$$ Eq. 10

Furthermore, if the disturbance r is represented at a single frequency as in Eq. 6 above, then an internal variable of the control system 30A may be represented by a single frequency. As a result, $y_n$ is represented by Eq. 11 below. H in Eq. 11 is represented by Eq. 12 below. The symbol ∠ represents the phase, and ∠H represents the phase of H. Further, P represents the transfer function of the VCM 7 shown in FIG. 2, and C represents the transfer function of the controller 33 shown in FIG. 2.

$$y_n = A|H|\sin(n\omega_r T + \angle H) \qquad \text{Eq. 11}$$

$$H = \frac{\frac{z}{F_D}}{1 + PC\frac{A}{F_D}} \qquad \text{Eq. 12}$$

With further reference to FIG. 3, in accordance with an embodiment of the present invention, $E(y_{n+1}y_n)$, $E(y_{n-1}y_n)$, and $E(y_n y_n)$ contained in Eq. 10 above may be represented by Eqs. 13 and 14 below. Further, B in the respective equations is represented by Eq. 15 below.

$$E(y_{n+1}y_n) = E(y_{n-1}y_n) = B\cos\omega_r T \qquad \text{Eq. 13}$$

$$E(y_n y_n) = B \qquad \text{Eq. 14}$$

$$B = \frac{A^2|H|^2}{2} \qquad \text{Eq. 15}$$

Thus, Eq. 10 above may be represented by Eq. 16 below.

$$E(x_n y_n) = B((b_2 + b_0)\cos\omega_r T - 2b_1) \qquad \text{Eq. 16}$$

The frequency updating unit 63 updates $b_1$ to cause Eq. 16 to be zero, so that, finally, Eq. 17 below is satisfied.

$$\cos\omega_r T (\equiv \cos 2\pi f_r T) = \frac{2b_1}{b_2 + b_0} \qquad \text{Eq. 17}$$

With further reference to FIG. 3, in accordance with an embodiment of the present invention, the transfer function with the denominator $F_D$ is, in this instance, represented by Eq. 18 below. By differentiating the absolute value of $F_D$ by $\omega$, the frequency at which the gain of $F_D$ is minimized, which is the frequency at which the gain of the peak filter 60 is maximized, center frequency $f_0$, is represented by Eq. 19 below.

$$F_D = b_2 z^2 - (b_2 + b_0)\cos\omega_r Tz + b_0 \qquad \text{Eq. 18}$$

$$\cos 2\pi f_0 T = \frac{(b_0 + b_2)^2}{4b_0 b_2}\cos 2\pi f_r T \qquad \text{Eq. 19}$$

Thus, the center frequency $f_0$ of the peak filter 60 and a frequency $f_r$ of the disturbance acting on the control system 30A do not always match with one another. A complete match occurs between the center frequency $f_0$ and the frequency $f_r$ of the disturbance in the event where Eq. 20 below is satisfied, which occurs when $b_2=b_0$, in which the gain at the center frequency of the peak filter 60 becomes infinite.

$$\frac{(b_0 + b_2)^2}{4b_0 b_2} = 1 \qquad \text{Eq. 20}$$

Hence, when the gain at the center frequency of the peak filter 60 is set to be finite, no complete match occurs between the center frequency $f_0$ of the peak filter 60 and the disturbance frequency $f_r$. As such, Eq. 20 above is modified to Eq. 21 below to set the gain at the center frequency of the peak filter 60 to be finite, and concurrently, to bring the center frequency $f_0$ of the peak filter 60 and the frequency $f_r$ of the disturbance acting on the control system 30A into close proximity to one another. In Equation 27, $\alpha$ represents a small absolute value (specifically, $|\alpha|<1$).

$$\frac{(b_0 + b_2)^2}{4b_0 b_2} = 1 + \alpha \qquad \text{Eq. 21}$$

Eq. 21 above may be modified as Eq. 22 below, and as a result of solution thereof, Eq. 23 below may be derived.

$$b_2^2 + b_0^2 + 2b_0 b_2 = 4(1+\alpha)b_0 b_2 \qquad \text{Eq. 22}$$

$$\left(\frac{b_0}{b_2}\right)^2 + 2(-1-2\alpha)\frac{b_0}{b_2} + 1 = 0$$

$$\frac{b_0}{b_2} = 1 + 2\alpha \pm \sqrt{(1+2\alpha)^2 - 1} = 1 + 2\alpha \pm 2\sqrt{\alpha(\alpha+1)} \qquad \text{Eq. 23}$$

With further reference to FIG. 3, in accordance with an embodiment of the present invention, since $b_0$ and $b_2$ are real numbers, the values have to be $\alpha<-1$ and $\alpha>0$ to satisfy Eq. 23 above. However, $\alpha$ is, as described above a small absolute value, so that $\alpha>0$ has to be employed as a condition. Thus, $\alpha$ is set to a small positive value, and Eq. 24 below may be derived.

$$\frac{b_0}{b_2} \approx 1 + 2\alpha \pm 2\sqrt{\alpha} \approx 1 \pm 2\sqrt{\alpha} \qquad \text{Eq. 24}$$

Furthermore, as described further below, the root of Eq. 5 above is a complex root, it has to be $0<b_0/b_2<1$ in order that the root is set inside of a unit circle in the relation between the root and the coefficient. Thus, Eq. 24 above may be modified to Eq. 25 below.

$$\frac{b_0}{b_2} \approx 1 - 2\sqrt{\alpha} \qquad \text{Eq. 25}$$

In this case, when it is defined as Eq. 26 below, also l is a small positive value, in particular, $0<l<1$, so that Eq. 25 above may be represented as Eq. 27 below.

$$\sqrt{\alpha} = \frac{l}{1+l} \qquad \text{Eq. 26}$$

-continued $$\frac{b_0}{b_2} = \frac{1-l}{1+l} \qquad \text{Eq. 27}$$

Thus, Eq. 5 above may be represented as Eq. 28 below.

$$F_D = b_2\left(z^2 - 2\frac{b_1}{b_2}z + \frac{1-l}{1+l}\right) \qquad \text{Eq. 28}$$
$$= \frac{b_2}{1+l}\left((1+l)z^2 - 2\frac{1+l}{b_2}b_1 z + 1 - l\right)$$

With further reference to FIG. 3, in accordance with an embodiment of the present invention, in this case, since $b_2/(1+l)$ applied to the entirety of Equation 34 above is a constant and may be neglected; and, $((1+l)/b_2)b_1$ applied to the primary term of z is changed to k, and substituted for by k. Thereby, Eq. 29 below may be derived.

$$F_D = (1+l)z^2 - 2kz + 1 - l \qquad \text{Eq. 29}$$

Eq. 29 above is equal to $F_D$ in Eq. 3 above. Thus, it may be known that $b_0 = 1-l$ and $b_2 = 1+l$ may be applied. Further, when they are assigned in Eq. 24 above, Eq. 30 below may be derived.

$$E(x_n, y_n) = B2(\cos \omega_r T - b_1) \qquad \text{Eq. 30}$$

According to Eq. 30, it may be said that the peak filter 60 is converged even with $b_0 = 1-l$ and $b_2 = 1+l$. When $b_0 = 1-l$ and $b_2 = 1+l$ are assigned in Eq. 18 above, Eq. 31 below may be derived.

$$F_D = (1+l)z^2 - 2\cos \omega T z + 1 - l \qquad \text{Eq. 31}$$

A root $\beta$ of Eq. 31 above is represented by Eq. 32 below.

$$\beta = \frac{\cos\omega T \pm \sqrt{\cos^2 \omega T + l^2 - 1}}{1+l} \qquad \text{Eq. 32}$$

The root $\beta$ is a complex root when l is small in Eq. 31 above, and the absolute value thereof is represented as Eq. 33 below in accordance with the relation between the root and the coefficient.

$$|\beta|^2 = \frac{1-l}{1+l} \qquad \text{Eq. 33}$$

In this case, when l is a small positive value, the value of $|\beta|^2$ is 1 or smaller, in which the peak filter 60 may be said to be stable. Furthermore, $\beta$ is not present in the unit circle with the z plane, so that the gain at the center frequency of the peak filter 60 is finite, which makes it possible to suppress phase variations.

With further reference to FIG. 3, in accordance with an embodiment of the present invention, the cosine functions in the range from 0 Hz to the Nyquist frequency are single-valued functions. Hence, it may be that, in Eq. 30 above, $b_1$ is defined as represented in Eq. 34 below, and $f_0$ is updated by the frequency updating unit 63.

$$b_1 = \cos 2\pi f_0 \qquad \text{Eq. 34}$$

Thus, in the case where the peak filter 60 is configured to be represented by Eq. 1 above and the gain at the center frequency of the peak filter 60 is set to be finite, the center frequency of the peak filter 60 may be brought into close proximity to the frequency of the disturbance acting on the control system 30A. Consequently, the disturbance may be suppressed, and phase variations around the center frequency may be suppressed.

With further reference to FIG. 3, in accordance with an embodiment of the present invention, in the preceding discussion, l has a value that satisfies: 0<l<1. In this range, on the one hand, as l is reduced and the gain at the center frequency is increased, the phase variation is increased so that the difference between the center frequency and the disturbance frequency is reduced. On the other hand, however, as l is increased, and the gain at the center frequency is reduced, the phase variation is reduced so that the difference between the center frequency and the disturbance frequency is increased. Thus, l may be appropriately determined depending on the circumstances described above.

Figure 4:
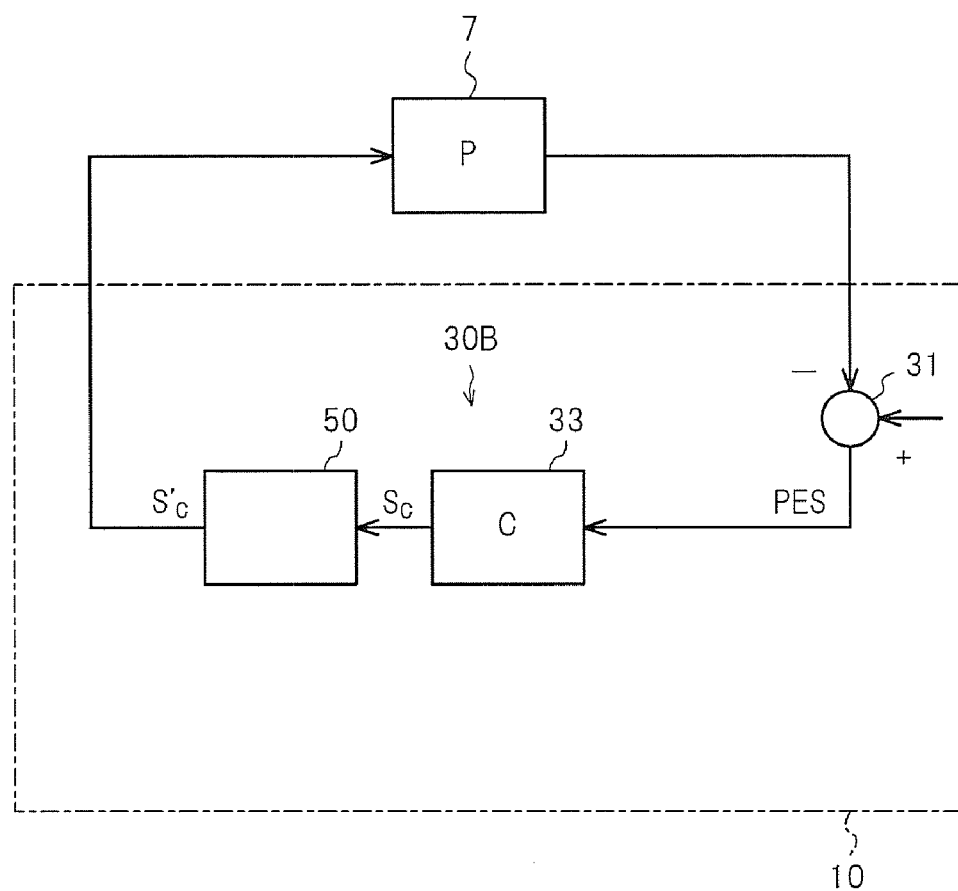
FIG. 4 is a block diagram showing an example configuration of a main control circuit including a frequency-hunting notch filter, in accordance with an embodiment of the present invention.

Description of Embodiments of the Present Invention for the Hard-Disk Drive Having a Main Control Circuit Including a Frequency-Hunting Notch Filter With reference now to FIG. 4, in accordance with an embodiment of the present invention, an example configuration of a main control circuit 10 including a frequency-hunting notch filter 50 is shown. Embodiments of the present invention having identical configurations will be designated by the same numerals in the drawings, and detailed descriptions thereof will be omitted if previously described. FIG. 4 illustrates the functional configuration of the main control circuit 10. The main control circuit 10 includes the PES generation circuit 31, controller 33, and frequency-hunting notch filter 50, which form a control system 30B for the VCM 7 that controls the access of the magnetic-recording disk 2 by the magnetic-recording head 4 in accordance with software operation of the MPU. The frequency-hunting notch filter 50 filters the control signal $S_C$ input from the controller 33, and outputs a signal $S'_C$ to the VCM 7 via the motor driver 17. In this case, the frequency-hunting notch filter 50 suppresses a signal component of the center frequency in the control signal $S_C$ output from the controller 33, and outputs the control signal $S'_C$. In the event that the center frequency has converged on the disturbance frequency, the disturbance contained in the control signal $S_C$ is suppressed.

Figure 5:
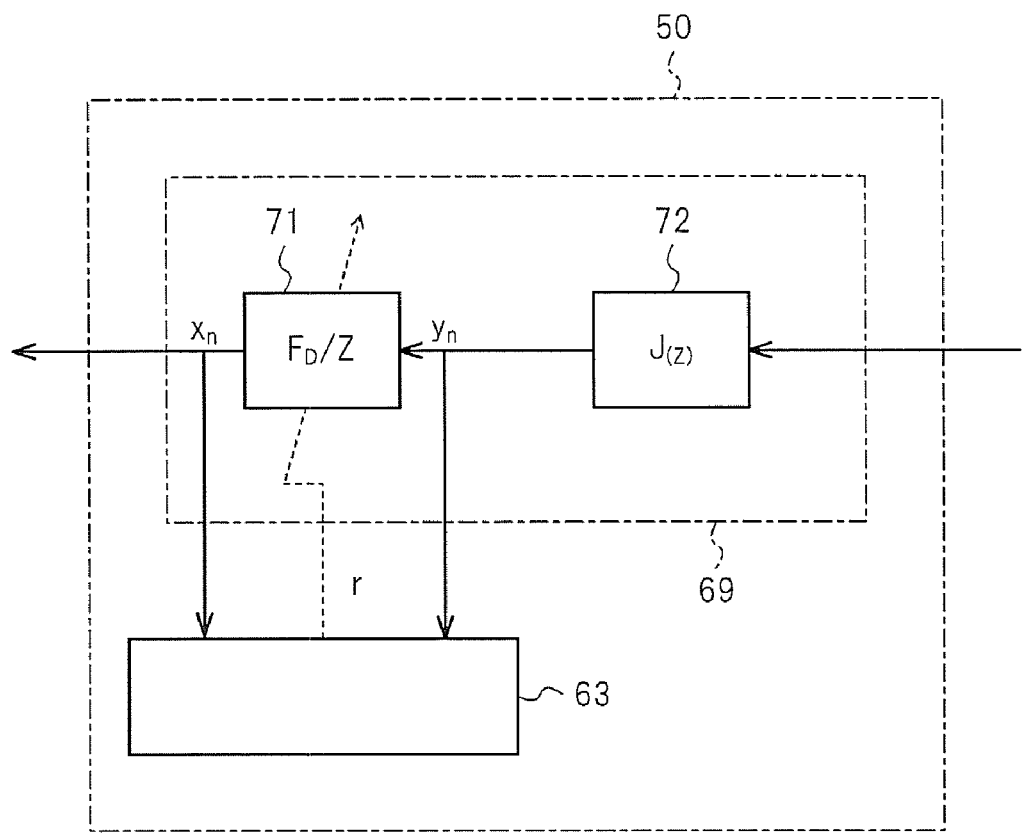
FIG. 5 is a block diagram showing an example configuration of a frequency-hunting notch filter, in accordance with an embodiment of the present invention.

With reference now to FIG. 5, in accordance with an embodiment of the present invention, an example configuration of a frequency-hunting notch filter 50 is shown. The frequency-hunting notch filter 50 includes a notch filter 69 and the frequency updating unit 63, which is a frequency estimation unit. A transfer function Q(z) of a general notch filter may be represented by Eq. 35 below. In Eq. 35, h represents a positive number that determines the band of a notch.

$$Q(z) = \frac{z^2 - 2\cos\omega_0 z + 1}{(1+h)z^2 - 2\cos\omega_0 z + 1 - h} \qquad \text{Eq. 35}$$

Eq. 35 above may be modified as Eq. 36 below.

$$Q(z) = \frac{z^2 - 2\cos\omega_0 z + 1}{z} \cdot \frac{z}{(1+h)z^2 - 2\cos\omega_0 z + 1 - h} \qquad \text{Eq. 36}$$

$$= \frac{J(z)}{P(z)}$$

In this case, P(z) contained in Eq. 36 above is represented by Eq. 37 below, and J(z) contained therein is represented by Eq. 38 below.

$$P(z) = \frac{z}{z^2 - 2\cos\omega_0 z + 1} \quad \text{Eq. 37}$$

$$J(z) = \frac{z}{(1+h)z^2 - 2\cos\omega_0 z + 1 - h} \quad \text{Eq. 38}$$

P(z) represented by Eq. 37 above is identical to the transfer function of the general peak filter, so that, generally, it may be said that the notch filter includes the transfer function of the peak filter. Actually, where the input into 1/P(z) at a time point n is represented by $y_n$, the z-transformation thereof is represented by Y, the output is represented by $x_n$, and the z-transformation thereof is represented by X, Eq. 40 below may be derived from Eq. 39 below. Eq. 40 has the same form as Eq. 9 above.

$$X = \frac{1}{P(z)}Y = \frac{z^2 - 2\cos\omega_0 z + 1}{z}Y \quad \text{Eq. 39}$$

$$x_n = y_{n+1} - 2\cos\omega_0 y_n + y_{n-1} \quad \text{Eq. 40}$$

With further reference to FIG. 5, in accordance with an embodiment of the present invention, the notch filter 69 of the present embodiment may be configured to include a inverse function of the peak filter 60. More specifically, the transfer function of the notch filter 69 is set to a transfer function indicated in Eq. 38 above, P(z) included therein is set identical to the transfer function represented by $z/F_D$ (see Eq. 3 above). Thus, the notch filter 69 may be represented by a filter 71 having the transfer function represented by $F_D/z$, which is the inverse function with respect to the transfer function represented by $z/F_D$, and a filter 72 having the transfer function represented by J(z). In accordance with the input signal $y_n$ of the filter 71 having the transfer function represented by $F_D/z$ and the output signal $x_n$, the frequency updating unit 63 updates the center frequency $f_0$ of the notch filter 69. By modifying Eq. 39 above as Eq. 41 below, Eq. 39 may be alternatively expressed such that the center frequency $f_0$ of the notch filter 69, which is the center frequency $f_0$ of the peak filter 60, is updated in accordance with the input signal $x_n$ of the transfer function represented by $z/F_D$ contained in the notch filter 69 and the output signal $y_n$.

$$Y = P(z)X = \frac{z}{F_D}X \quad \text{Eq. 41}$$

Thus, the gain at the center frequency $f_0$ of the peak filter 60 is finite, and not infinite, so that the gain at the center frequency $f_0$ of the notch filter 69 may be prevented from becoming zero. Consequently, phase variations around the center frequency $f_0$ may be suppressed.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A hard-disk drive comprising:
    a main control circuit for an actuator configured to move a magnetic-recording head relative to a magnetic-recording disk, the main control circuit comprising:
    a frequency-hunting peak filter comprising:
        a peak filter wherein a gain at a center frequency becomes finite and a reciprocal of the transfer function is represented by $z/F_D$ in z-transform space, where a denominator of the transfer function of the peak filter that is represented by $F_D$, has a real part and an imaginary part, wherein the real part of the denominator of the transfer function becomes zero at the center frequency and the imaginary part of the denominator of the transfer function becomes a positive number at the center frequency; and
        a frequency updating unit that updates the center frequency to converge onto a frequency of a disturbance by obtaining a comparative relation between the center frequency and the frequency of the disturbance acting on the control system in accordance with a phase difference between an input and output of the transfer function represented by $z/F_D$.

2. The hard-disk drive of claim 1, wherein the transfer function represented by $z/F_D$ is represented by a first equation given by $$\frac{z}{F_D} = \frac{z}{(1+l)z^2 - 2kz + 1 - l}$$

where k represents a variable corresponding to the center frequency, and l represents a value satisfying: 0<l<1.

3. The hard-disk drive of claim 1, wherein the transfer function represented by $z/F_D$ is represented by a second equation given by:

$$\frac{z}{F_D} = \frac{z}{(1+l)z^2 - 2\cos 2\pi f_0 z + 1 - l}$$

where $f_0$ represents the center frequency, and l represents a value satisfying: 0<l<1.

4. The hard-disk drive of claim 1, wherein the transfer function represented by $z/F_D$ is represented by a third equation given by:

$$\frac{z}{F_D} = \frac{1}{2\cos\omega - 2k + 2il\sin\omega}$$

where k represents a variable corresponding to the center frequency, and l represents a value satisfying: 0<l<1.

5. A method for controlling a hard-disk drive that includes a main control circuit for an actuator that is configured to move a magnetic-recording head relative to a magnetic-recording disk, wherein the main control circuit includes a frequency-hunting peak filter, the method comprising:

applying the frequency-hunting peak filter wherein the frequency-hunting peak filter includes a peak filter wherein a gain at a center frequency becomes finite and a reciprocal of the transfer function is represented by $z/F_D$, where a denominator of the transfer function of the peak filter that is represented by $F_D$ has a real part and an imaginary part, wherein the real part of the denominator of the transfer function becomes zero at the center frequency and the imaginary part of the denominator of the transfer function becomes a positive number at the center frequency; and applying a frequency updating unit that updates the center frequency to converge onto a frequency of a disturbance by obtaining a comparative relation between the center frequency and the frequency of the disturbance acting on the control system in accordance with a phase difference between an input and output of the transfer function represented by $z/F_D$.

6. A hard-disk drive comprising:

a main control circuit for an actuator configured to move a magnetic-recording head relative to a magnetic-recording disk, the main control circuit comprising:

a frequency-hunting notch filter comprising:

a notch filter wherein a gain at a center frequency does not become zero and the transfer function is represented by $F_D/z$, where a numerator of the transfer function of the notch filter that is represented by $F_D$, has a real part and an imaginary part, wherein the real part of the numerator of the transfer function becomes zero at the center frequency and the imaginary part of the numerator of the transfer function becomes a positive number at the center frequency; and a frequency updating unit that updates the center frequency to converge onto a frequency of a disturbance by obtaining a comparative relation between the center frequency and the frequency of the disturbance acting on the control system in accordance with a phase difference between an input and output of the transfer function represented by $F_D/z$.

7. The hard-disk drive of claim 6, wherein the transfer function represented by $F_D/z$ is represented by a fourth equation given by:

$$\frac{F_D}{z} = \frac{(1+l)z^2 - 2kz + 1 - l}{z}$$

where k represents a variable corresponding to the center frequency, and l represents a value satisfying: $0<l<1$.

8. The hard-disk drive of claim 6, wherein the transfer function represented by $F_D/z$ is represented by a fifth equation given by:

$$\frac{F_D}{z} = \frac{(1+l)z^2 - 2\cos 2\pi f_0 z + 1 - l}{z}$$

where $f_0$ represents the center frequency, and l is a value satisfying: $0<l<1$.

9. The hard-disk drive of claim 6, wherein the transfer function represented by $F_D/z$ is represented by a sixth equation given by:

$$\frac{F_D}{z} = 2\cos\omega - 2k + 2il\sin\omega$$

where k represents a variable corresponding to the center frequency, and l represents a value satisfying: $0<l<1$.

10. A method for controlling a hard-disk drive that includes a main control circuit for an actuator that is configured to move a magnetic-recording head relative to a magnetic-recording disk, wherein the main control circuit includes a frequency-hunting notch filter, the method comprising:

applying the frequency-hunting notch filter wherein a gain at a center frequency does not become zero and the transfer function is represented by $F_D/z$, where a numerator of the transfer function of the notch filter that is represented by $F_D$, has a real part and an imaginary part, wherein the real part of the numerator of the transfer function becomes zero at the center frequency and the imaginary part of the numerator of the transfer function becomes a positive number at the center frequency; and applying a frequency updating unit that updates the center frequency to converge onto a frequency of a disturbance by obtaining a comparative relation between the center frequency and the frequency of the disturbance acting on the control system in accordance with a phase difference between an input and output of the transfer function represented by $F_D/z$.

* * * * *